United States Patent
Tien et al.

(10) Patent No.: US 9,864,245 B2
(45) Date of Patent: Jan. 9, 2018

(54) PIXEL STRUCTURE

(71) Applicant: Au Optronics Corporation, Hsinchu (TW)

(72) Inventors: Kun-Cheng Tien, New Taipei (TW); Shu-En Li, Tainan (TW); Chien-Huang Liao, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 88 days.

(21) Appl. No.: 14/822,882

(22) Filed: Aug. 10, 2015

(65) Prior Publication Data

US 2016/0218115 A1 Jul. 28, 2016

(30) Foreign Application Priority Data

Jan. 28, 2015 (TW) .............................. 104102834 A

(51) Int. Cl.
*G02F 1/1343* (2006.01)
*G02F 1/1362* (2006.01)
*G02F 1/1337* (2006.01)

(52) U.S. Cl.
CPC .... *G02F 1/13624* (2013.01); *G02F 1/133707* (2013.01); *G02F 2001/134345* (2013.01)

(58) Field of Classification Search
CPC ............... H01L 27/124; H01L 27/0207; G02F 1/13624; G02F 1/133707; G02F 2001/134345
USPC ......................................................... 349/144
See application file for complete search history.

(56) References Cited

U.S. PATENT DOCUMENTS

| 6,424,398 | B1 | 7/2002 | Taniguchi | |
|---|---|---|---|---|
| 8,330,921 | B2 | 12/2012 | Tsao et al. | |
| 9,461,073 | B2 | 10/2016 | Xu et al. | |
| 2005/0036085 | A1 | 2/2005 | Sunohara et al. | |
| 2010/0066952 | A1* | 3/2010 | Tsuchiya | G02F 1/133514 349/106 |
| 2011/0149223 | A1 | 6/2011 | Tsao et al. | |
| 2012/0147310 | A1 | 6/2012 | Lee et al. | |
| 2012/0162559 | A1 | 6/2012 | Kim et al. | |
| 2013/0050629 | A1* | 2/2013 | Kang | G02F 1/133707 349/144 |
| 2014/0043554 | A1* | 2/2014 | No | G02F 1/136227 349/43 |
| 2016/0027798 | A1 | 1/2016 | Xu et al. | |

FOREIGN PATENT DOCUMENTS

| CN | 102305983 | 1/2012 |
|---|---|---|
| CN | 103792741 | 5/2014 |
| CN | 103926721 | 7/2014 |
| TW | 201122685 | 7/2011 |

* cited by examiner

*Primary Examiner* — Charles Chang
(74) *Attorney, Agent, or Firm* — JCIPRNET

(57) ABSTRACT

A pixel structure including a plurality of sub-pixels arranged in array is provided. Each of the sub-pixels includes an active device and a pixel electrode electrically connected to the active device respectively. Each of the pixel electrodes includes a plurality of stripe patterns respectively, and spacings of at least one portion of the stripe patterns of at least one of the sub-pixels are larger than spacings of the stripe patterns of the other sub-pixels.

11 Claims, 7 Drawing Sheets

PIXEL STRUCTURE

CROSS-REFERENCE TO RELATED APPLICATION

This application claims the priority benefit of Taiwan application serial no. 104102834, filed on Jan. 28, 2015. The entirety of the above-mentioned patent application is hereby incorporated by reference herein and made a part of this specification.

TECHNICAL FIELD

The present disclosure relates to a pixel structure, and more particularly, to a pixel structure that the color shift problem at the side view is improved.

BACKGROUND

The liquid crystal display panel, with its good spatial utilization, low power consumption and radiation-free and other distinguished features, has gradually become the mainstream in the display device market. For better display quality of the liquid crystal display panel, various liquid crystal display panels with wide view angles have been developed on the market. However, among these wide view angle liquid crystal display panels, a portion of these wide view angle liquid crystal display panels adopts a special design for the electrode, such that the light transmittance is not the same and is a dependent variable of the view angle. Therefore, the brightness displayed by the liquid crystal display panel is not the same when the user is at the frontal view and at the side view of the displayed image such that the color shift and the inadequate color saturation phenomenon of the displayed image will happen.

To improve above-mentioned problems, the prior art divide each sub-pixel into two regions by using the space arrangement, and these regions are configured to have one pixel electrode, respectively. By the adjustment of the voltage value, two types of brightness rendered at the same time from these two regions are different from each other. Therefore, a middle brightness is rendered from these two types of brightness so that when the user is at front view or at side view of the displayed image, the user can see the displayed image with similar brightness. However, because a gap is kept between the two pixel electrodes of each sub-pixel to maintain electrical independency, the liquid crystal molecules at the gap can not be driven, thus forming a dark region. Hence, the pixel structure adopting above-mentioned design can easily cause a low aperture ratio and is not suitable for applying to the high resolution display panel.

To improve above-mentioned problems, a method of adjusting the frame rate has been proposed to cut one original frame time into two frame times under the configuration that a single region (a single pixel electrode) architecture is still applied for the sub-pixels. By the adjustment of voltage value, two displayed images with different brightness are rendered sequentially to human eyes by using different frame times, such that the same effect as the above-mentioned space arrangement method is achieved by the persistence of vision theory. Although this development can improve the problem that the gap affects the aperture ratio, the color shift effect at the side view still needs to be enhanced.

Since the display apparatus is becoming more popular and the desire of people about the displayed image with high resolution and high color saturation, the aperture ratio and the color shift problems of the pixel structure need to be further improved. Hence, how to further improve the color shift at the side view problem under the ideal aperture ratio condition will become a tendency in the future.

SUMMARY

The present disclosure is directed to a pixel structure, in which the color shift at the side view problem is improved under the ideal aperture ratio condition.

The pixel structure of the present disclosure includes a plurality of sub-pixels that are arranged in array. Each of the sub-pixels includes an active device and a pixel electrode that is electrically connected to the active device, respectively. Each of the pixel electrodes includes a plurality of stripe patterns, respectively. Spacings of at least one portion of the stripe patterns of at least one of the sub-pixels are larger than spacings of the stripe patterns of the other sub-pixels.

Based on the above, the spacings of at least one portion of the stripe patterns of the pixel structure of the present disclosure are enlarged such that the hue of the displayed image at the side view may be adjusted by increasing the light transmittance of the at least one portion of the sub-pixels, thus improving the color shift problem of the displayed image at the side view. Since the design of spacing adjustment is helpful for reducing the lost in aperture ratio, the color shift at the side view problem is improved under the ideal aperture ratio condition in the pixel structure of the present disclosure.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1A:
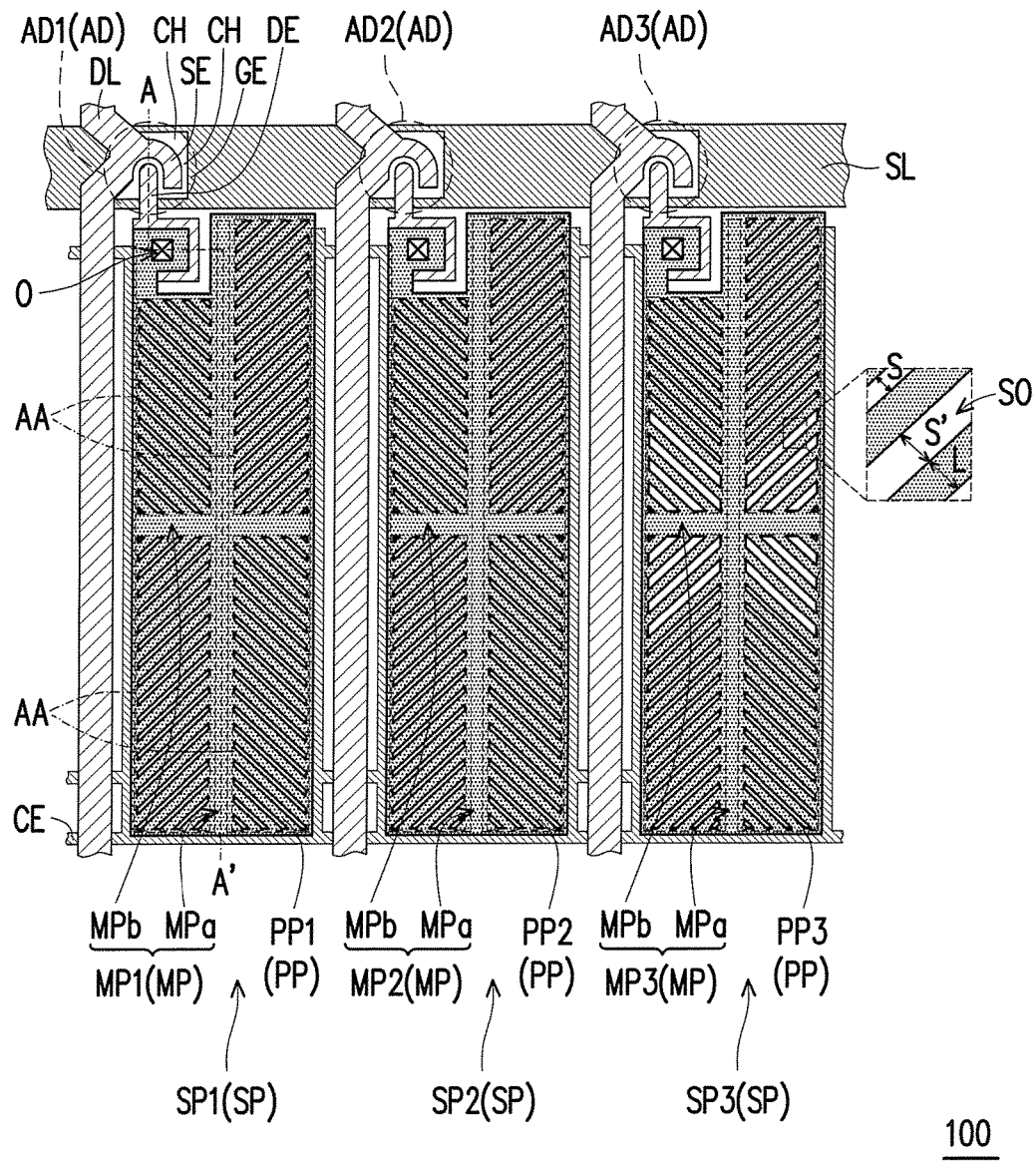
FIG. 1A is a schematic top view of a pixel structure according to a first embodiment of the present disclosure.
Figure 1B:
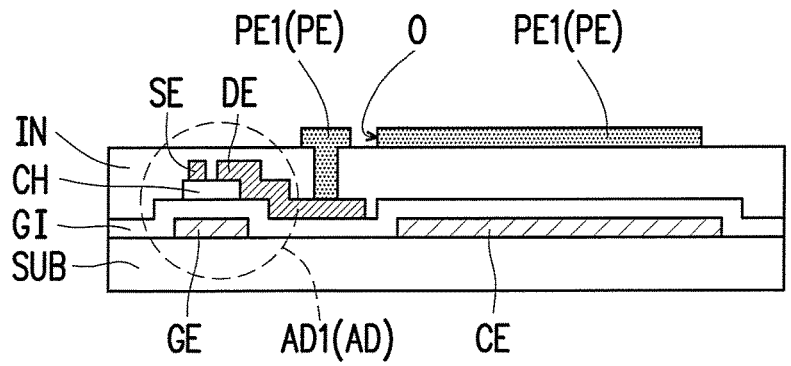
FIG. 1B is a schematic cross-sectional view taken along a section line A-A' depicted in FIG. 1A.
Figure 1C:
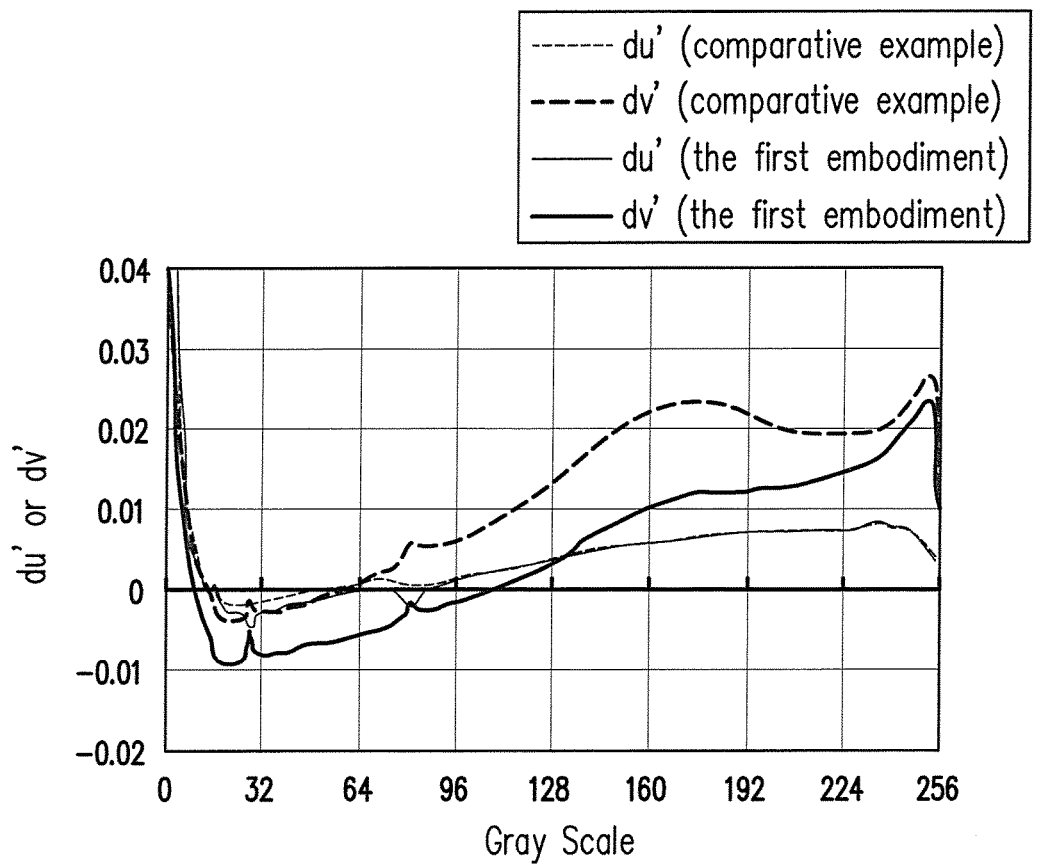
FIG. 1C is a relation diagram of the gray scale and the color coordinate offsets at the 45 degree side view according to the pixel structures of a comparative example and the first embodiment of the present disclosure.

FIG. 1A is a schematic top view of a pixel structure according to a first embodiment of the present disclosure, wherein some film layers are neglected in FIG. 1A. FIG. 1B is a schematic cross-sectional view taken along a section line A-A' depicted in FIG. 1A. FIG. 1C is a relation diagram of the gray scale and the color coordinate offsets at the 45 degree side view according to the pixel structures of a comparative example and the first embodiment of the present disclosure. Referring to FIG. 1A and FIG. 1B, the pixel structure 100 of the embodiment includes a plurality of sub-pixels SP that are arranged in array. Each of the sub-pixels SP includes an active device AD and a pixel electrode PE electrically connected to the active device AD, respectively. Each of the pixel electrodes PE includes a plurality of stripe patterns PP, respectively.

Specifically, the sub-pixels SP include a first sub-pixel SP1, a second sub-pixel SP2, and a third sub-pixel SP3. The first sub-pixel SP1, the second sub-pixel SP2, and the third sub-pixel SP3 are respectively the red sub-pixel, the green sub-pixel, and the blue sub-pixel, but are not limited thereto. The first sub-pixel SP1 includes a first active device AD1 and a first pixel electrode PE1 electrically connected to the first active device AD1, and the first pixel electrode PE1 includes a plurality of first stripe patterns PP1. The second sub-pixel SP2 includes a second active device AD2 and a second pixel electrode PE2 electrically connected to the second active device AD2, and the second pixel electrode PE2 includes a plurality of second stripe patterns PP2. The third sub-pixel SP3 includes a third active device AD3 and a third pixel electrode PE3 electrically connected to the third active device AD3, and the third pixel electrode PE3 includes a plurality of third stripe patterns PP3.

The first sub-pixel SP1, the second sub-pixel SP2, and the third sub-pixel SP3 are respectively disposed on the substrate SUB and are alternately arranged along one direction, for example. A plurality of scan lines SL, a plurality of data lines DL, and a common electrode CE can be further disposed on the substrate SUB (only one scan line SL is shown in FIG. 1A). The scan lines SL and the data lines DL cross each other to define the regions of the first sub-pixel SP1, the second sub-pixel SP2, and the third sub-pixel SP3. In addition, each of the first sub-pixel SP1, the second sub-pixel SP2, and the third sub-pixel SP3 are respectively adapted to be driven by one of the scan lines SL and one of the data lines DL.

To be more specific, each of the active devices AD (including the first active device AD1, the second active device AD2, and the third active device AD3) is respectively adapted to be electrically connected to the corresponding scan line SL and the corresponding data line DL, and each of the active devices AD respectively includes a gate electrode GE, a gate insulating layer GI, a channel layer CH, a source electrode SE, and a drain electrode DE, wherein the gate electrode GE is connected to the scan line SL and the source electrode SE is connected to the data line DL. As shown in FIG. 1B, the active device AD1, the second active device AD2, and the third active device AD3 (only the first active device AD1 is shown in FIG. 1B) are, for example, bottom gate thin film transistors, wherein the gate electrode GE is disposed on the substrate SUB, the gate insulating layer GI covers the gate electrode GE, the channel layer CH is disposed on the gate insulating layer GI and located above the gate electrode GE, the source electrode SE and the drain electrode DE are separated from each other and extended from the gate insulating layer GI onto the channel layer CH, respectively. However, the shape and type of the first active device AD1, the second active device AD2, and the third active device AD3 can be altered based on different designed requirements, thus are not limited to the above.

The first sub-pixel SP1, the second sub-pixel SP2, and the third sub-pixel SP3 may further include an insulating layer IN. The insulating layer IN covers the first active device AD1, the second active device AD2, and the third active device AD3, and the insulating layer IN is adapted to provide a flat bearing surface for the first pixel electrode PE1, the second pixel electrode PE2, and the third pixel electrode PE3. In addition, the insulating layer IN includes a plurality of openings O exposing the drain electrodes DE, such that the first pixel electrode PE1, the second pixel electrode PE2, and the third electrode PE3 may be connected to the drain electrodes DE through the corresponding openings O, respectively. Thus, the first pixel electrode PE1 is electrically connected to the first active device AD1, the second pixel electrode PE2 is electrically connected to the second active device AD2, and the third pixel electrode PE3 is electrically connected to the third active device AD3.

Each of the pixel electrodes PE (including the first pixel electrode PE1, the second pixel electrode PE2, the third pixel electrode PE3) can further include trunk portions MP (including a first trunk portion MP1, a second trunk portion MP2, a third trunk portion MP3), respectively, wherein each of the pixel electrodes PE is divided into a plurality of display fields AA by the corresponding trunk portion MP. As shown in FIG. 1A, the shape of each of the trunk portions MP is, for example, the cross shape, and each of the trunk portions MP includes a first extension portion MPa and a second extension portion MPb, wherein the first extension portion MPa and the second extension portion MPb are, for example, crossed at the center of the pixel electrode PE, and each of the pixel electrodes PE is divided into 4 display fields AA by the corresponding trunk portion MP. In other words, each of the pixel electrodes PE is a 4 display field electrode.

The stripe patterns PP (including the first stripe patterns PP1, the second stripe patterns PP2, and the third stripe patterns PP3) are respectively arranged in the display fields AA, and the stripe patterns PP at the same display field AA are arranged along the same direction. In addition, the stripe patterns PP are, for example, respectively extended outwardly and inclinedly from the trunk portion MP. In other words, the extension direction of the stripe patterns PP is neither horizontal nor vertical to the first extension portion MPa and the second extension portion MPb.

In addition, spacings of at least one portion of the stripe patterns PP of at least one of the sub-pixels SP are larger than spacings of the stripe patterns PP of the other sub-pixels SP. Specifically, the spacings of at least one portion of the stripe patterns PP in the embodiment are enlarged, such that light transmittance of the corresponding sub-pixels SP is increased, thus enhancing the brightness of the sub-pixels SP at the side view. As a result, the hue rendered by the displayed image at the side view is adjusted, and the color shift problem is also improved.

As shown in FIG. 1A, in the embodiment, the width of each of the first stripe patterns PP1, the second stripe patterns PP2 and the third stripe patterns PP3 is L, and each of the spacings of the first stripe patterns PP1, the second stripe patterns PP2 and a portion of the third stripe patterns PP3 is S, and each of the spacings of the other portions of the third stripe patterns PP3 is S', and 1 micron≤(S'−S)≤2.5 micron. The above-mentioned width is the linewidth of the stripe patterns PP, and each of the spacings is the distance between two adjacent stripe patterns in the same display field AA along their arranging direction. Specifically, each of the pixel electrodes PE (including the first pixel electrode PE1, the second pixel electrode PE2, and the third pixel electrode PE3) includes a plurality of stripe openings SO. The stripe openings SO are arranged corresponding to the display fields AA. In each display fields AA, each of the stripe openings SO is respectively located in between two adjacent stripe patterns PP, and the stripe openings SO and the stripe patterns PP, which are located at the same display field AA, are arranged along the same direction. The width of each of the stripe openings SO along the arranging direction is each of the spacings.

In this embodiment, the width L is 4 micron, and each of the spacings S is 2 micron, and each of the spacings S' is between 3 micron and 4.5 micron. In addition, within the third stripe patterns SP3, an area occupied by the portion of the third stripe patterns PP3 having the spacings S is I, and an area occupied by the portion of the third stripe patterns PP3 having the spacings S' is I', and I and I' satisfy the following condition:

$$0.33 \leq [I'/(I+I')] \leq 0.66$$

By increasing a portion of spacings of the third stripe patterns PP3 (the spacings S' are larger than the spacings S), the light transmittance of the blue sub-pixel (the third sub-pixel SP3) is increased at the side view. Since the blue light and the yellow light are mixed together to become white light, the phenomenon that the image of middle to high gray scale shifts towards yellow at the side view can be improved. As shown by the thick solid line and the thick dashed line in FIG. 1C, the comparative example adopts the design of stripe patterns with the same spacings. Compared to the comparative example, the dv' at middle to high grey scale of the above-mentioned structure of this embodiment is decreased at the side view (the bigger value of dv', the more shifting of the image of middle to high gray scale towards yellow). Therefore, the above-mentioned design of the embodiment can effectively improve the phenomenon that the image of middle to high gray scale shifts towards yellow at the side view. In addition, under the configuration that the amount of pixel electrode PE in each of the sub-pixels SP is one in this embodiment, except for preventing the gap, that causes the aperture ratio being decreased, between two electrodes in each conventional pixel structure, the aperture ratio of at least one portion of sub-pixels is further increased by increasing a portion of the spacings of the stripe patterns PP. As a result, in the pixel structure 100, the color shift at the side view problem is improved under the ideal aperture ratio condition.

Figure 2A:
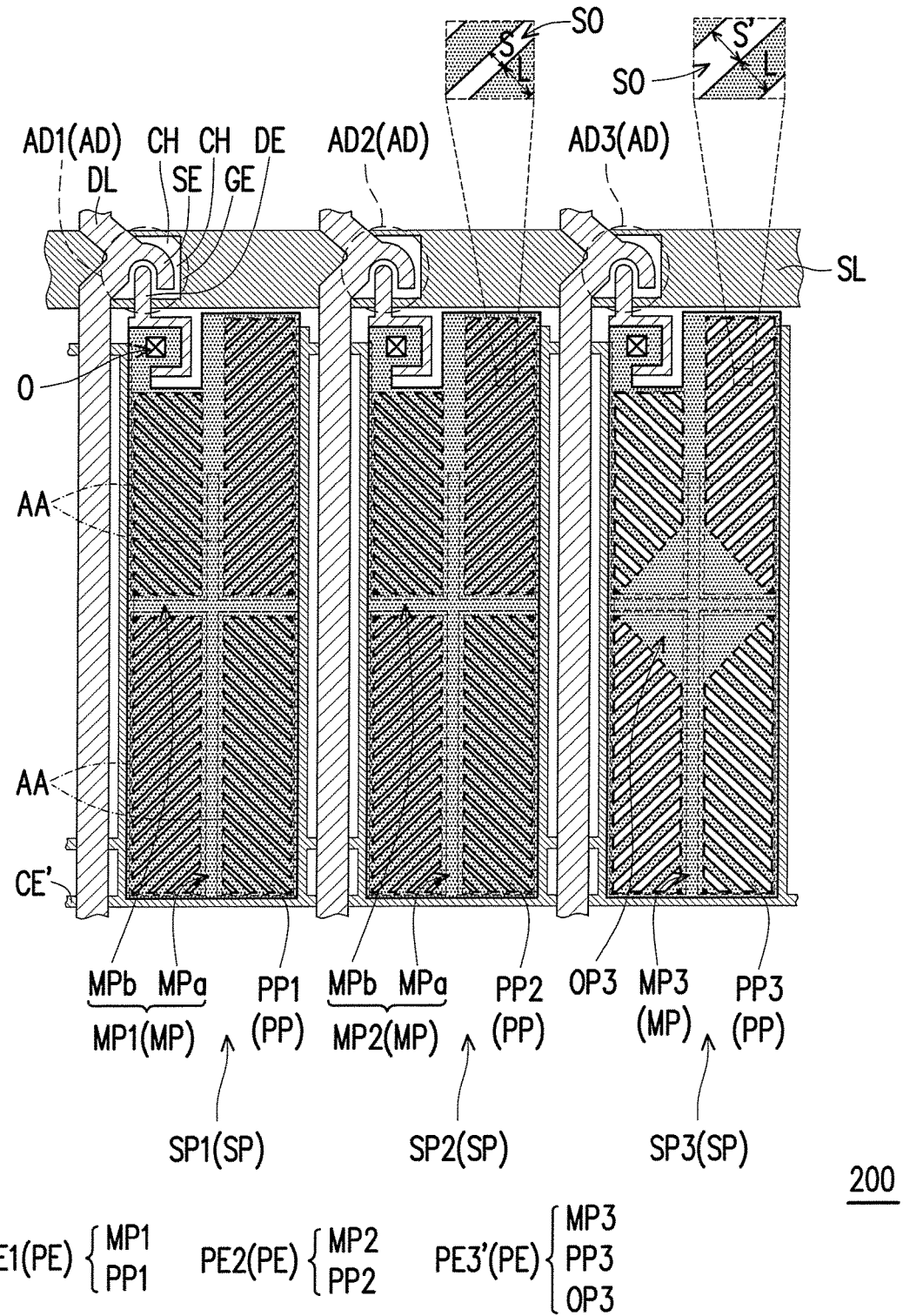
FIG. 2A is a schematic top view of a pixel structure according to a second embodiment of the present disclosure.
Figure 2B:
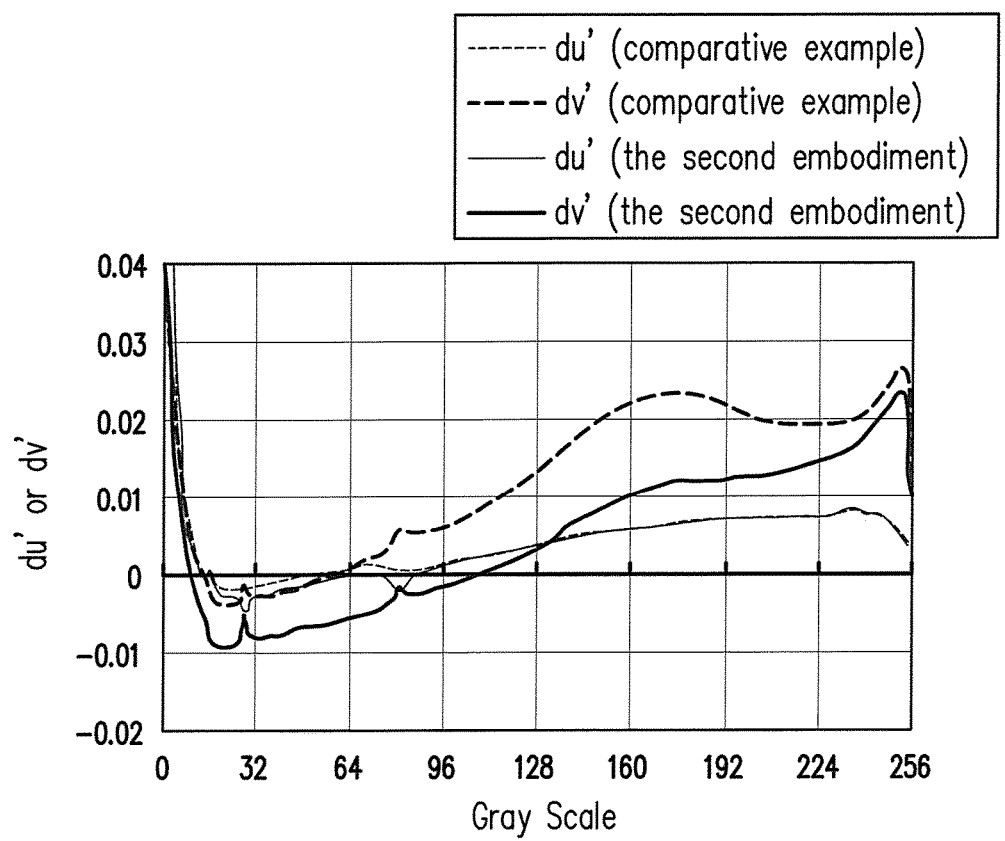
FIG. 2B is a relation diagram of the gray scale and the color coordinate offsets at the 45 degree side view according to the pixel structures of a comparative example and the second embodiment of the present disclosure.
Figure 3:
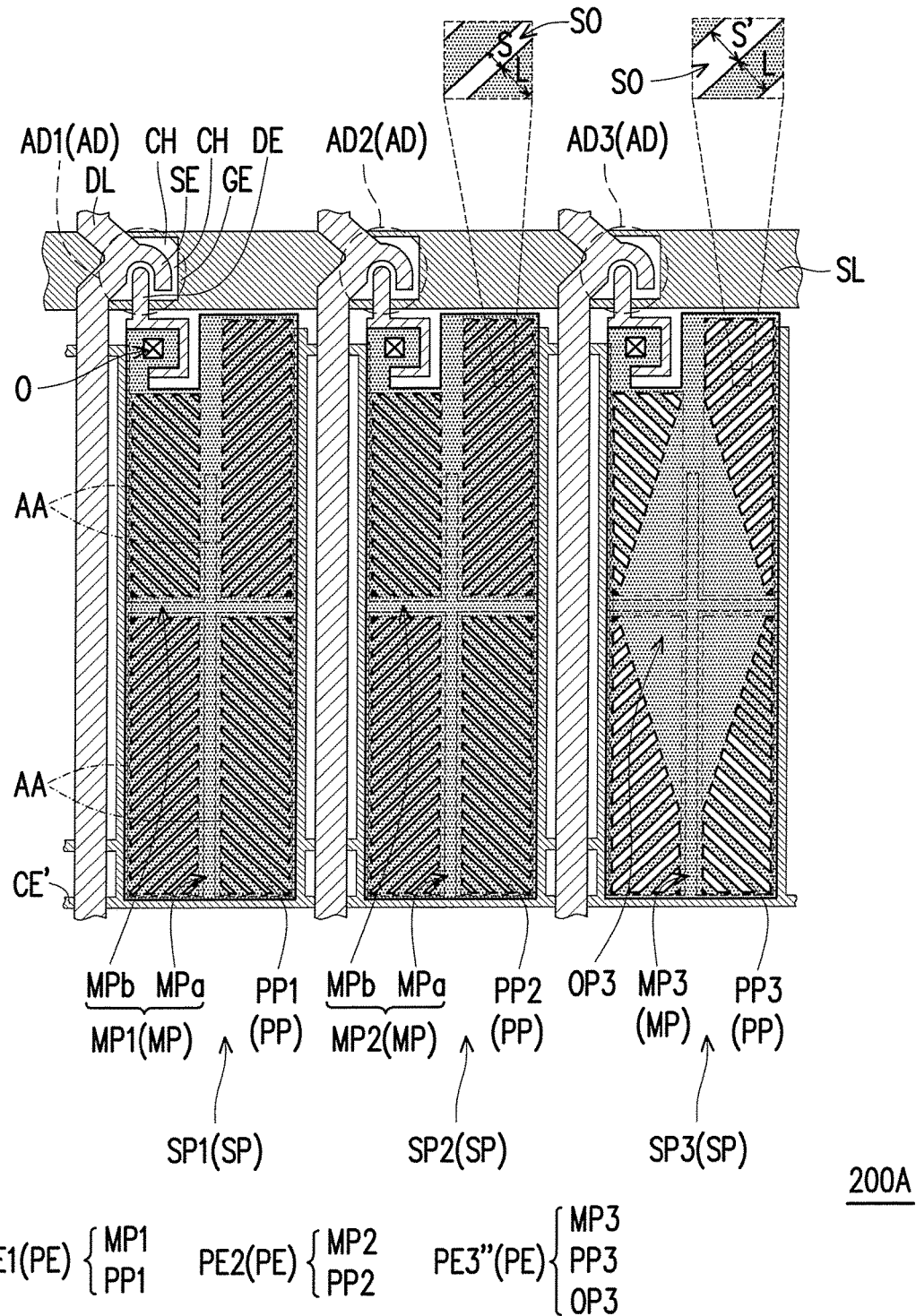
FIG. 3 is another schematic top view of a pixel structure according to the second embodiment of the present disclosure.

FIG. 2A is schematic a top view of a pixel structure according to a second embodiment of the present disclosure. FIG. 2B is a relation diagram of the gray scale and the color coordinate offsets at the 45 degree side view according to the pixel structures of a comparative example and the second embodiment of the present disclosure. FIG. 3 is another schematic top view of a pixel structure according to the second embodiment of the present disclosure. Referring to FIG. 2A and FIG. 2B, the pixel structure 200 of this embodiment is similar with the pixel structure 100, and identical elements are indicated by the same reference numbers and are not described hereinafter. The main difference between the pixel structure 200 and the pixel structure 100 is the spacings of the third stripe patterns PP3 as all S'. In addition, the third pixel electrode PE3' further includes a diamond shape patterns OP3, wherein the third trunk portion MP3 is connected to the diamond shape patterns OP3, and the third stripe patterns PP3 are connected to the third trunk portion MP3 and the diamond shape patterns OP3. In addition, the third stripe patterns PP3 are extended outwardly from the third trunk portion MP3. In this embodiment, the diamond shape patterns OP3 and the third trunk portion MP3, for example, intersect at the middle of the third pixel electrode PE3, and the third stripe patterns PP3 is also extended outwardly from the diamond shape patterns OP3.

In this embodiment, the width L is 4 micron, and each of the spacings S is 2 micron, and each of the spacings S' is between 3 micron and 4.5 micron. In addition, within the third stripe patterns SP3, an area occupied by the diamond shape patterns OP3 is II, and an area occupied by the third stripe patterns PP3 having the spacings S' is II', and II and II' satisfy the following condition:

$$0.50 \leq [II'/(II+II')] \leq 0.90$$

By the disposition of the diamond shape patterns OP3 and the adjustment of the area occupied by the diamond shape patterns OP3 in the third sub-pixel SP3 (FIG. 2A shows a situation when the area occupied by the diamond shape patterns OP3 is relatively small, and FIG. 3 shows another situation when the area occupied by the diamond shape patterns OP3 is relatively large), the threshold voltage of the third electrode PE3', PE3" can be decreased and the brightness of the third electrode PE3', PE3" at the side view in low voltage condition can be increased, thus improving the phenomenon that the image of middle to high gray scale shifts towards yellow at the side view. In addition, since the spacings S' of the third stripe patterns PP3 are larger than the spacings S of the first stripe patterns PP1 and the second stripe patterns PP2, in the embodiments in FIG. 2A and FIG. 3, the light transmittance of the blue sub-pixel (the third sub-pixel SP3) is increased at the side view. Because the blue light and the yellow light are mixed together to become white light, the phenomenon that the image of middle to high gray scale shifts towards yellow at the side view can be improved. As shown by the thick solid line and the thick dashed line in FIG. 2B, comparing to the comparative example that adopting the design of stripe patterns with the same spacings, the dv' at middle to high grey scale of the above-mentioned structure is decreased at the side view. Therefore, the above-mentioned design can effectively improve the phenomenon that the image of middle to high gray scale shifts towards yellow at the side view. In addition, under the configuration that the amount of pixel electrode PE in each of the sub-pixels SP is one in the embodiments in FIG. 2A and FIG. 3, except for preventing the gap, that causes the aperture ratio being decreased, between two electrodes in each conventional pixel structure, the aperture ratio of the third sub-pixel SP3 is further increased by increasing the spacings S' of the third stripe patterns PP3. As a result, in the pixel structures 200 and 200A, the color shift at the side view problem is improved under the ideal aperture ratio condition, and the pixel structures 200 and 200A are suitable to be applied in the high resolution display apparatus.

In the embodiment in FIG. 1A, the common electrode CE is distributed along the edges of each of the pixel electrodes PE. In addition, a portion of the common electrode CE is further distributed along the first extension portion MPa to become a stripe electrode located under the first extension portion MPa, but the disclosure is not limited thereto. As shown in FIG. 2A and FIG. 3, a portion of the common electrode CE' may be distributed along the first extension portion MPa and the second extension portion MPb to become a cross shape electrode located under the first extension portion MPa and the second extension portion MPb.

Figure 4:
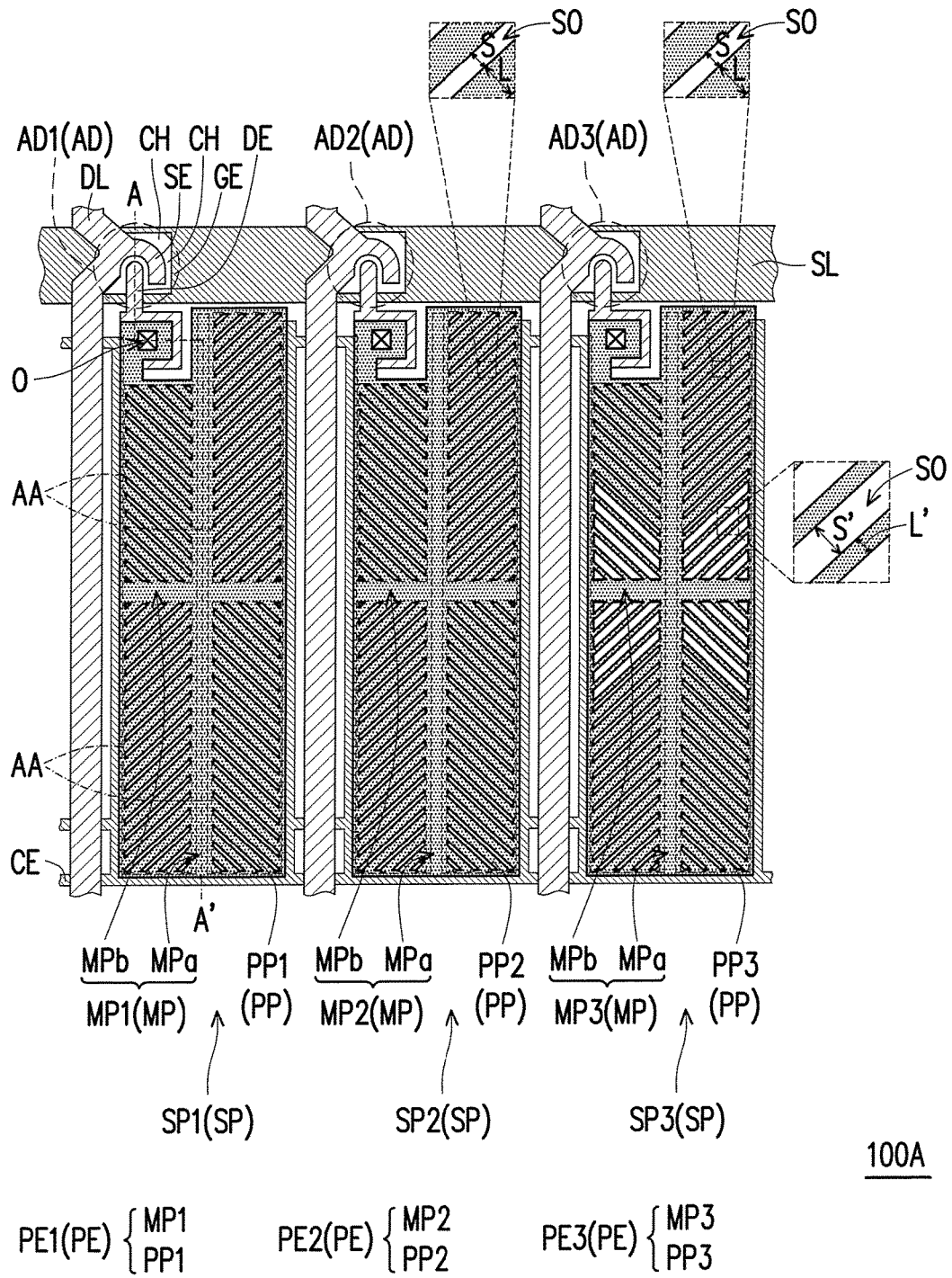
FIG. 4 is another schematic top view of a pixel structure according to the first embodiment of the present disclosure.

In the aforesaid embodiments, light transmittance of different sub-pixels are adjusted by enlarging the spacings of at least one portion of the stripe patterns PP, but the present disclosure is not limited thereto. In another embodiment, light transmittance of different sub-pixels may be adjusted by changing widths of at least one portion of the stripe patterns PP. FIG. 4 is another schematic top view of a pixel structure according to the first embodiment of the present disclosure. Referring to FIG. 4, the pixel structure 100A of this embodiment is similar with the pixel structure 100, and identical elements are indicated by the same reference numbers and are not described hereinafter. The main difference between the pixel structure 100A and the pixel structure 100 is that widths of a portion of the third stripe patterns PP3 are L, respectively, and widths of the other portions of the third stripe patterns PP3 are L', respectively. In addition, each of the spacings of the portion of the third stripe patterns PP3 is S, and each of the spacings of the other portions of the third stripe patterns PP3 is S', wherein (L'+S')=(L+S), and 1 micron≤(S'−S)≤2.5 micron. In this embodiment, the width L is 4 micron, and each of the spacings S is 2 micron, the width L' is 2.5 micron, and each of the spacings S' is 3.5 micron, but the present disclosure is not limited thereto.

Figure 5:
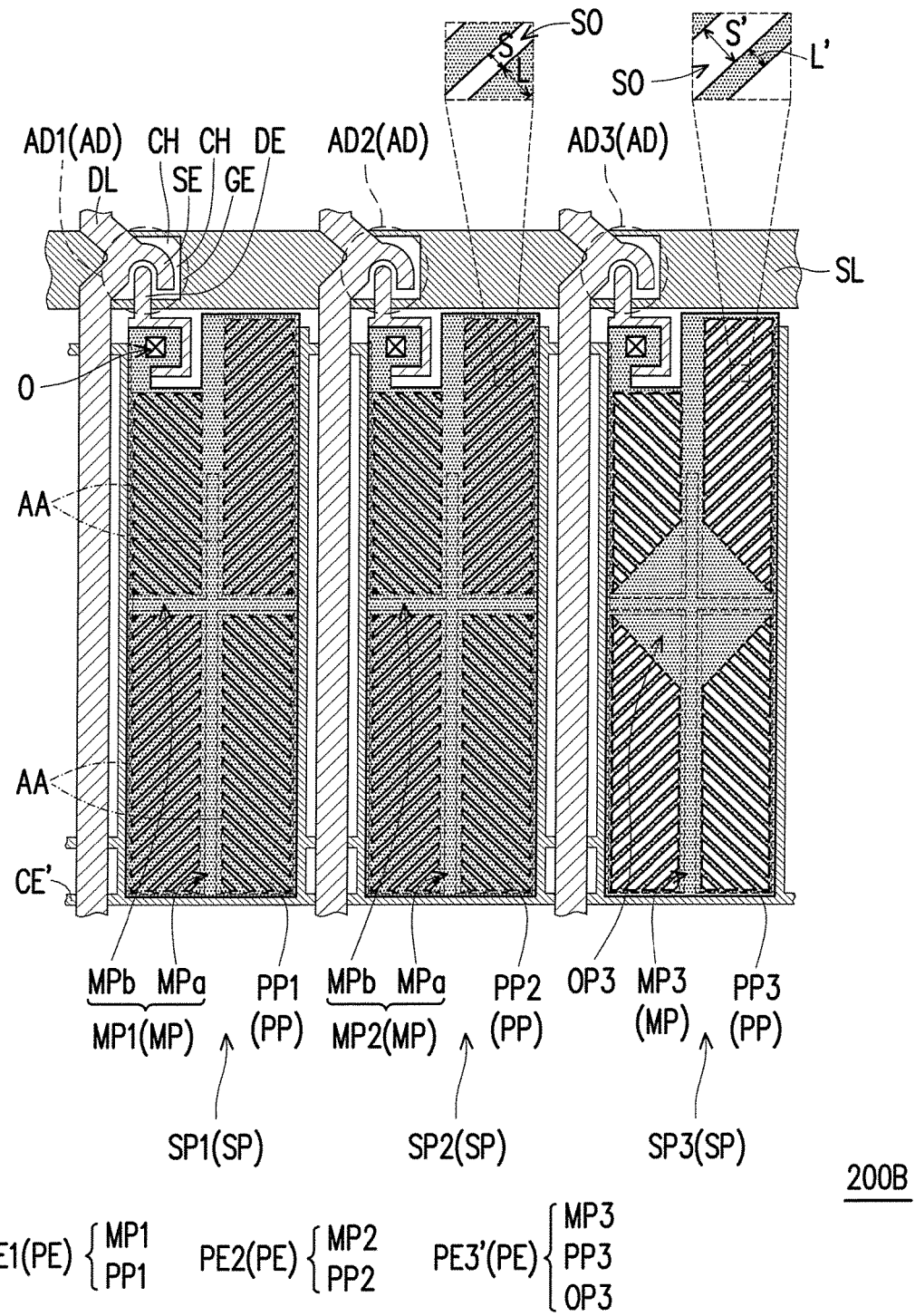
FIG. 5 is still another schematic top view of a pixel structure according to the second embodiment of the present disclosure.

FIG. 5 is still another schematic top view of a pixel structure according to the second embodiment of the present disclosure. Referring to FIG. 5, the pixel structure 200B of this embodiment is similar with the pixel structure 200, and identical elements are indicated by the same reference numbers and are not described hereinafter. The main difference between the pixel structure 200B and the pixel structure 200 is that a width of each of the third stripe patterns PP3 is L', wherein (L'+S')=(L+S), and 1 micron≤(S'−S)≤2.5 micron.

In the embodiments in FIG. 4 and FIG. 5, widths of at least one portion of the stripe patterns are reduced such that the corresponding spacings may be further enlarged. Therefore, the hue of the displayed image at the side view may be adjusted by adjusting light transmittance of different sub-pixels, thus improving the color shift problem at the side view.

In summary, the spacings of at least one portion of the stripe patterns are enlarged in the pixel structure of the present disclosure such that the hue of the displayed image at the side view may be adjusted by adjusting light transmittance of different sub-pixels, thus improving the color shift problem at the side view. Since the design of spacing adjustment is helpful for reducing the lost in aperture ratio, the color shift at the side view problem is improved under the ideal aperture ratio condition in the pixel structure of the present disclosure.

Although the present disclosure has been described with reference to the above embodiments, it will be apparent to one of the ordinary skill in the art that modifications to the described embodiment may be made without departing from the spirit of the present disclosure. Accordingly, the scope of the present disclosure will be defined by the attached claims not by the above detailed descriptions.

What is claimed is:

1. A pixel structure, comprising a plurality of sub-pixels arranged in array, each of the sub-pixels comprising an active device and a pixel electrode electrically connected to the active device respectively, each of the pixel electrodes comprising a plurality of stripe patterns respectively, and spacings of at least one portion of the stripe patterns of at least one of the sub-pixels being larger than spacings of the stripe patterns of the other sub-pixels, wherein the sub-pixels comprise:
a first sub-pixel, comprising a first pixel electrode comprising a plurality of first stripe patterns;
a second sub-pixel, comprising a second pixel electrode comprising a plurality of second stripe patterns; and
a third sub-pixel, comprising a third pixel electrode comprising a plurality of third stripe patterns,
wherein the first pixel electrode further comprises a first trunk portion, the second pixel electrode further comprises a second trunk portion, the third pixel electrode further comprises a diamond pattern and a third trunk portion connected to the diamond pattern, wherein the first stripe patterns are connected to and extended outwardly from the first trunk portion, the second stripe patterns are connected to and extended outwardly from the second trunk portion, and the third stripe patterns are connected to the diamond pattern and the third trunk portion and extended outwardly from the third trunk portion.

2. The pixel structure according to claim 1, wherein the sub-pixels comprising:
a first sub-pixel, comprising a first active device and a first pixel electrode electrically connected to the first active device, and the first pixel electrode comprising a plurality of first stripe patterns;
a second sub-pixel, comprising a second active device and a second pixel electrode electrically connected to the second active device, and the second pixel electrode comprising a plurality of second stripe patterns; and
a third sub-pixel, comprising a third active device and a third pixel electrode electrically connected to the third active device, and the third pixel electrode comprising a plurality of third stripe patterns,
wherein a width of each of the first stripe patterns, each of the second stripe patterns and each of the third stripe patterns is L, and each of the spacings of the first stripe patterns, the second stripe patterns and a portion of the third stripe patterns is S, each of the spacings of the other portions of the third stripe patterns is S', and 1 micron ≤(S'−S) ≤2.5 micron.

3. The pixel structure according to claim 2, wherein the width L is 4 micron, and each of the spacings S is 2 micron, and each of the spacings S' is between 3 micron and 4.5 micron.

4. The pixel structure according to claim 2, wherein the first pixel electrode further comprises a first trunk portion, the second pixel electrode further comprises a second trunk portion, the third pixel electrode further comprises a third trunk portion, wherein the first stripe patterns are connected to and extended outwardly from the first trunk portion, the second stripe patterns are connected to and extended outwardly from the second trunk portion, and the third stripe patterns are connected to and extended outwardly from the third trunk portion.

5. The pixel structure according to claim 4, wherein within the third stripe patterns, an area occupied by the portion of the third stripe patterns having the spacings S is I, and an area occupied by the portion of the third stripe patterns having the spacings S' is I', and I and I' satisfy the following condition:

$$0.33 \leq [I'/(I+I')] \leq 0.66.$$

6. The pixel structure according to claim 2, wherein the first sub-pixel is a red sub-pixel, the second sub-pixel is a green sub-pixel, and the third sub-pixel is a blue sub-pixel.

7. The pixel structure according to claim 1, wherein the first sub-pixel further comprises a first active device and the first pixel electrode is electrically connected to the first active device, the second sub-pixel further comprises a second active device and the second pixel electrode is electrically connected to the second active device, and the third sub-pixel further comprises a third active device and the third pixel electrode is electrically connected to the third active device, wherein a width of each of the first stripe patterns, each of the second stripe patterns and each of the third stripe patterns is L, and each of the spacings of the first stripe patterns, the second stripe patterns is S, each of the spacings of the third stripe patterns is S', and 1 micron ≤(S'−S) ≤2.5 micron.

8. The pixel structure according to claim 7, wherein the width L is 4 micron, and each of the spacings S is 2 micron, and each of the spacings S' is between 3 micron and 4.5 micron.

9. The pixel structure according to claim 7, wherein within the third stripe patterns, an area occupied by the diamond pattern is II, and an area occupied by the third stripe patterns having the spacings S' is II', and II and II' satisfies the following condition:

0.50≤[II'/(II+II')]≤0.90.

10. The pixel structure according to claim 1, wherein the sub-pixels comprising:

a first sub-pixel, comprising a first active device and a first pixel electrode electrically connected to the first active device, and the first pixel electrode comprising a plurality of first stripe patterns;

a second sub-pixel, comprising a second active device and a second pixel electrode electrically connected to the second active device, and the second pixel electrode comprising a plurality of second stripe patterns; and a third sub-pixel, comprising a third active device and a third pixel electrode electrically connected to the third active device, and the third pixel electrode comprising a plurality of third stripe patterns, wherein a width of each of the first stripe patterns and each of the second stripe patterns is L, and each of the spacings of the first stripe patterns and the second stripe patterns is S, widths of a portion of the third stripe patterns are L, respectively, and widths of the other portions of the third stripe patterns are L', respectively, each of the spacings of the portion of the third stripe patterns is S, and each of the spacings of the other portions of the third stripe patterns is S', wherein (L'+S')=(L+S), and 1 micron ≤(S'−S) ≤2.5 micron.

11. The pixel structure according to claim 1, wherein the first sub-pixel further comprises a first active device and the first pixel electrode is electrically connected to the first active device, the second sub-pixel further comprises a second active device and the second pixel electrode is electrically connected to the second active device, and the third sub-pixel further comprises a third active device, the third pixel electrode is electrically connected to the third active device, wherein a width of each of the first stripe patterns and each of the second stripe patterns is L, and each of the spacings of the first stripe patterns and the second stripe patterns is S, a width of each of the third stripe patterns is L', and each of the spacings of the third stripe patterns is S', wherein (L'+S')=(L+S), and 1 micron ≤(S'−S) ≤2.5 micron.

* * * * *